(12) United States Patent
Schlegel et al.

(10) Patent No.: US 8,088,430 B1
(45) Date of Patent: Jan. 3, 2012

(54) TRANS FAT FREE SHORTENING AND METHOD FOR MAKING SAME

(75) Inventors: Christopher Schlegel, Bolingbrook, IL (US); Ray Bidwell, Yorba Linda, CA (US); Joseph N. Higgs, Fullerton, CA (US)

(73) Assignee: Ventura Foods, LLC, Brea, CA (US)

( * ) Notice: Subject to any disclaimer, the term of this patent is extended or adjusted under 35 U.S.C. 154(b) by 404 days.

(21) Appl. No.: 12/052,411

(22) Filed: Mar. 20, 2008

(51) Int. Cl.
*A23D 7/00* (2006.01)

(52) U.S. Cl. .......................... 426/606; 426/312; 426/604

(58) Field of Classification Search .................. 426/606, 426/601, 654, 524
See application file for complete search history.

(56) References Cited

U.S. PATENT DOCUMENTS

| | | | |
|---|---|---|---|
| 3,145,017 A | 8/1964 | Thomas | |
| 3,430,928 A | 3/1969 | Smith | |
| 4,073,339 A | 2/1978 | D'Orsay | |
| 5,470,598 A | 11/1995 | Scavone | |
| 5,908,655 A | 6/1999 | Doucet | |
| 6,544,579 B1 | 4/2003 | Landon | |
| 2007/0148312 A1 | 6/2007 | Skogerson et al. | |
| 2007/0148313 A1 | 6/2007 | Skogerson et al. | |
| 2007/0148314 A1 | 6/2007 | Skogerson et al. | |

*Primary Examiner* — Lien T. Tran
*Assistant Examiner* — Katherine DeGuire
(74) *Attorney, Agent, or Firm* — Jones, Walker, Waechter, Poitevent, Carrere & Denegre, LLP

(57) ABSTRACT

An improved method for preparing a shortening composition comprising the steps of blending a non-hydrogenated vegetable oil with an emulsifier to form a liquid mixture, the emulsifier comprising monoglycerides and diglycerides; utilizing a pre-determined minimum cooling rate, a nucleation temperature and a nucleation time for the mixture; blending an inert gas into the liquid mixture until the mixture comprises at least 5% by volume inert gas; pumping the mixture through a scraped surface heat exchanger to rapidly cool the mixture, wherein the temperature of the mixture changes at a rate of at least the minimum cooling rate; controlling the cooling rate of the mixture within the scraped surface heat exchanger such that the mixture is cooled to the nucleation temperature before the mixture exits the scraped surface heat exchanger; pumping the cooled mixture from the scraped surface heat exchanger to a working unit before the nucleation time has elapsed, wherein the nucleation time is measured from the moment at which the mixture reaches the nucleation temperature, and wherein the working unit mechanically works the cooled mixture; and filling a metered amount of the shortening composition into a container for further processing and packaging.

23 Claims, 4 Drawing Sheets

TRANS FAT FREE SHORTENING AND METHOD FOR MAKING SAME

I. CROSS-REFERENCE TO RELATED APPLICATION

Not Applicable.

II. STATEMENT REGARDING FEDERALLY SPONSORED RESEARCH OR DEVELOPMENT

Not Applicable.

III. THE NAMES OF THE PARTIES TO A JOINT RESEARCH AGREEMENT

Not Applicable.

IV. INCORPORATION-BY-REFERENCE OF MATERIAL SUBMITTED ON A COMPACT DISC

Not Applicable.

V. BACKGROUND OF THE INVENTION

A. Field of the Invention

The present invention relates to an improved method for preparing a trans fat free all purpose shortening composition.

B. Background Art

Shortening is the common term for semi-solid fats used in food preparation, especially baked goods. The material makeup of shortening has changed over time, from a natural fat (e.g., butter, lard) to blends of oils with hard fats to hydrogenated liquid oils to blends of oils with additives like emulsifiers, antioxidants, anti-foamers, metal scavengers, anti-spattering agents, etc. Shortenings can be found in virtually every type of prepared food product, and affect the structure, stability, flavor, storage quality, eating characteristics, and eye appeal of such products. Two approaches are widely practiced to develop a desired solid fat content profile for the specific temperatures required in food preparation applications: hydrogenation of a source oil and/or the addition of solid fats to a source oil.

The introduction of hydrogenation (circa 1910) to the development of vegetable shortenings enabled the production of shortenings with increased oxidative stability, improved uniformity and enhanced performance characteristics. Additionally, the improvement of processes for solidification, filling, packaging and crystallization were devised to enhance the appearance and performance of shortenings. As a result, pure vegetable shortening with increased stability and improved creaming properties (typically, bland, white in color, and featuring a smooth texture) were accepted by both consumers and industrial users or bakers.

Hydrogenation of an unsaturated fatty acid refers to the addition of hydrogen atoms to the acid, causing double bonds to become single ones as carbon atoms acquire new hydrogen partners (to maintain four bonds per carbon atom). Full hydrogenation results in a molecule containing the maximum amount of hydrogen (in other words, the conversion of an unsaturated fatty acid into a saturated one). Partial hydrogenation results in the addition of hydrogen atoms at some of the empty positions, with a corresponding reduction in the number of double bonds. In most naturally occurring unsaturated fatty acids, the hydrogen atoms are on the same side of the double bonds of the carbon chain (cis isomers). However, partial hydrogenation reconfigures some of the double bonds that do not become chemically saturated, twisting them such that the hydrogen atoms end up on different sides of the chain (trans isomer). The trans isomer formation is lower in energy, and favored in the hydrogenation process.

Commercial hydrogenation is typically partially accomplished in order to obtain a malleable fat that is solid at room temperature, but melts upon baking (or consumption). Partially hydrogenated vegetable oils are also available in a wide range of consistencies and have other desirable characteristics (i.e., longer shelf life), making them the predominant ingredient in pure vegetable shortenings, today. Pure vegetable shortenings are made from refined edible vegetable oils, usually a blend of two or more partially hydrogenated oils.

Each source oil exhibits inherent crystallization tendencies, passing through one or more unstable crystalline stages before assuming either a $\beta$ or $\beta'$. $\beta$ crystals are large, coarse and self-occluding. $\beta'$ crystals are small and needlelike, tending to pack together into dense, fine-grained structures. Edible oil products contain various combinations of $\beta$ and $\beta'$ tending components, and the ratio of a $\beta$-$\beta'$ contributes to the dominant crystal habit. Typical conventional shortening compositions comprise a major oil source that tends to form a $\beta$ crystals, combined with a minor oil source that tends to form $\beta'$ crystals. The minor oil source then serves to promote $\beta'$ crystals for improved plasticity.

Pure commercially available vegetable shortenings may currently be made by blending 8 to 10% of a hard fat to promote $\beta'$ crystallization (typically palm or cottonseed oil fully hydrogenated to an iodine value of roughly 1-8) with a soybean oil shortening base, consisting of soybean oil hydrogenated to an iodine value of about 75 at roughly 425° F. and 10 psi. This mixture is pumped into a small closed system, where the fat is continuously solidified through a scraped surface heat exchanger. The fluid mixture is supercooled to about 80 to 85° F., wherein small $\beta$ crystals begin to form. The supercooled mixture is then pumped into a worker unit to continue the growth of small crystals without additional cooling. The resulting shortening composition is packed and allowed to temper at about 80° F. for 1 to 3 days to achieve the required crystal structure. In this process, crystallization of the shortening may be achieved with some level of inaccuracy.

During the last decade or more, consumers have become increasingly interested in the quantity of trans isomers (also known as "trans fats") present in food products. Before 2006, consumers in the United States could not directly determine the quantity of trans fats in prepared food products. Indeed, the presence of trans fats could only be inferred from the ingredient list, notably from identifying any partially hydrogenated ingredients. On Jul. 11, 2003, the Food and Drug Administration (FDA) issued a regulation requiring manufacturers to list on the Nutrition Facts panel the amount of trans fats of prepared food products and some dietary supplements. The labeling rule required mandatory compliance by Jan. 1, 2006 (although companies could petition for an extension to Jan. 1, 2008). The regulation allows trans fats in levels of less than 0.5 grams per serving to be labeled as "zero grams per serving." The FDA did not approve nutrient content claims such as "trans fat free" or "low trans fat," because it opted to not establish a Recommended Daily Value. However, the FDA defines "trans fat" as a fat containing one or more trans isomers not in a conjugated system. This is an important distinction, as it distinguishes non-conjugated synthetic trans fats from naturally occurring fatty acids with conjugated trans double bonds, such as conjugated linoleic acid.

The FDA estimates that by 2009 trans fat labeling will have prevented from 600 to 1,200 cases of coronary heart disease and 250 to 500 deaths each year. This benefit is expected to result from consumers choosing alternative foods lower in trans fats, as well as manufacturers reducing the amount of trans fats in their products.

Cities across the United States are acting to reduce consumption of trans fats. In May 2005, Tiburon, Calif., became the first American city where all restaurants voluntarily cook with trans fat free oils. Montgomery County, Md., approved a ban on partially hydrogenated oils, becoming the first county in the nation to restrict trans fats. New York City barred restaurants from using most frying and spreading fats containing artificial trans fats above 0.5 grams per serving by Jul. 1, 2007, and in all of their foods by Jul. 1, 2008. By Sep. 1, 2007, eateries in Philadelphia must cease frying food in trans fats, and by Sep. 1, 2008, trans fat cannot be used as an ingredient in Philadelphia commercial kitchens (excluding small local bakeries).

In an effort to reduce the quantity of trans fats in prepared food products, including shortenings, manufacturers have turned to alternative processes for producing shortenings and other prepared food products. One alternative is the introduction of higher levels of saturated fats, which naturally contain higher solid fat contents. Some typically used saturated fats include palm oil, palm kernel oil, and coconut oil. However, diets high in saturated fats contribute to heart disease. Replacing trans fats with saturated fats is not an acceptable alternative for shortening manufacturers.

Emulsification provides yet another alternative to preparing shortening compositions with desirable physical characteristics. The introduction of emulsified shortenings (circa 1933) enabled the development of specialty shortenings designed for specific applications. For example, shortenings containing mono- and diglyceride emulsions, in addition to the source oils, exhibited a finer dispersion of smaller sized fat particles, thus strengthening cakes and permitting higher sugar levels. Super-glycerinated shortenings produced moister, higher volume cakes, and, remarkably, lighter icings with higher moisture levels. Presently, specialty shortenings have been designed for applications as diverse as layer cakes, pound cakes, cake mixes, cream fillings, icings, whipped toppings, breads, sweet dough, puff pastries and other baked products. Although mono- and diglyceride emulsifiers are created from saturated fats, their introduction into shortening compositions does not impart a significant increase in the amount of saturated fats compared to conventional shortening compositions, and imparts a significantly lower amount of saturated fats compared to shortening compositions low in trans fats due to the replacement of partially hydrogenated vegetable oils with higher solid fat content oils such as palm or coconut.

Recently, a mono- and diglyceride emulsifier having an elevated concentration of diglycerides was discovered to achieve desirable shortening characteristics, when suspended in a liquid source oil, without the introduction of harmful trans fats and without a significant increase in additional saturated fats compared to conventional all purpose shortenings. In particular, mono- and diglyceride emulsifiers with an elevated level of diglycerides have been shown to promote a β crystalline formation upon recrystallization after melting. Therefore, the development of emulsifiers with elevated levels of diglycerides holds great potential for the development of useful trans fat free prepared food products. Moreover, diglycerides demonstrate much weaker interaction with water, and can be used at much higher levels in many applications with little or no reformulation. Diglycerides also recrystallize from a melt more quickly than triglycerides with similar fatty acid profiles. As a result, various blends of diglycerides may be used to mimic or improve the melting behavior of common fat-based products, and eliminate the need for minor source oils to promote a β' crystal growth, these source oils typically having higher levels of hydrogenation and/or saturated fats.

One problem, however, is that crystallization of an emulsified shortening using high diglyceride emulsifiers cannot be accomplished using the known manufacturing process for preparing shortenings from partially hydrogenated oils. In practice, traditional partially hydrogenated soybean oil shortening may be manufactured on a continuous line system at speeds of approximately 28,000 pounds per hour. Mono- and diglyceride emulsifiers crystallize rapidly over a smaller range of temperatures. Therefore, in order to successfully manufacture trans fat free shortenings manufactured from blends containing non-hydrogenated vegetable oils with mono- and diglyceride emulsifiers, the manufacturer must more precisely control crystallization in the product line, as well as the amount of work applied to the blend to form the shortening composition, by reducing the speed within the line system, and by controlling the cooling rate within the scraped surface heat exchanger. Embodiments of the present invention address the problem of manufacturing a trans fat free shortening using emulsifiers, particularly mono- and diglyceride emulsifiers with an elevated level of diglycerides, and provide methods for manufacturing shortening compositions that contain essentially zero grams of trans fats per serving and that do not contain significantly increased levels of saturated fats.

VI. BRIEF SUMMARY OF THE INVENTION

In one embodiment, the present invention includes an improved method for preparing a shortening composition comprising the steps of blending a non-hydrogenated vegetable oil with an emulsifier to form a liquid mixture, the emulsifier comprising monoglycerides and diglycerides; utilizing a pre-determined minimum cooling rate, a nucleation temperature and a nucleation time for the mixture; blending an inert gas into the liquid mixture until the mixture comprises at least about 5 by volume inert gas; pumping the mixture through a scraped surface heat exchanger to rapidly cool the mixture, wherein the temperature of the mixture changes at a rate of at least the minimum cooling rate; controlling the cooling rate of the mixture within the scraped surface heat exchanger such that the mixture is cooled to the nucleation temperature before the mixture exits the scraped surface heat exchanger; pumping the cooled mixture from the scraped surface heat exchanger to a working unit before the nucleation time has elapsed, wherein the nucleation time is measured from the moment at which the mixture reaches the nucleation temperature, and wherein the working unit mechanically works the cooled mixture; and filling a metered amount of the shortening composition into a container for further processing and packaging.

In another embodiment, the present invention includes a shortening composition characterized by a creamy white appearance, a bland flavor and aroma and a firm texture, wherein the shortening composition is prepared from a mixture comprising at least seventy percent by weight non-hydrogenated vegetable oil and at least ten percent by weight an emulsifier, the emulsifier comprising at least sixty-five percent by weight diglycerides, and wherein the shortening composition is prepared by cooling the mixture in a scraped surface heat exchanger at a cooling rate of at least about 176°

F. per minute, then minimally mechanically working the mixture such that it transforms into the shortening composition without further cooling.

VII. BRIEF DESCRIPTION OF THE SEVERAL VIEWS OF THE DRAWINGS

In consideration of the following detailed description of the various embodiments, the invention may be more completely understood in connection with the following drawings.

Figure 1:
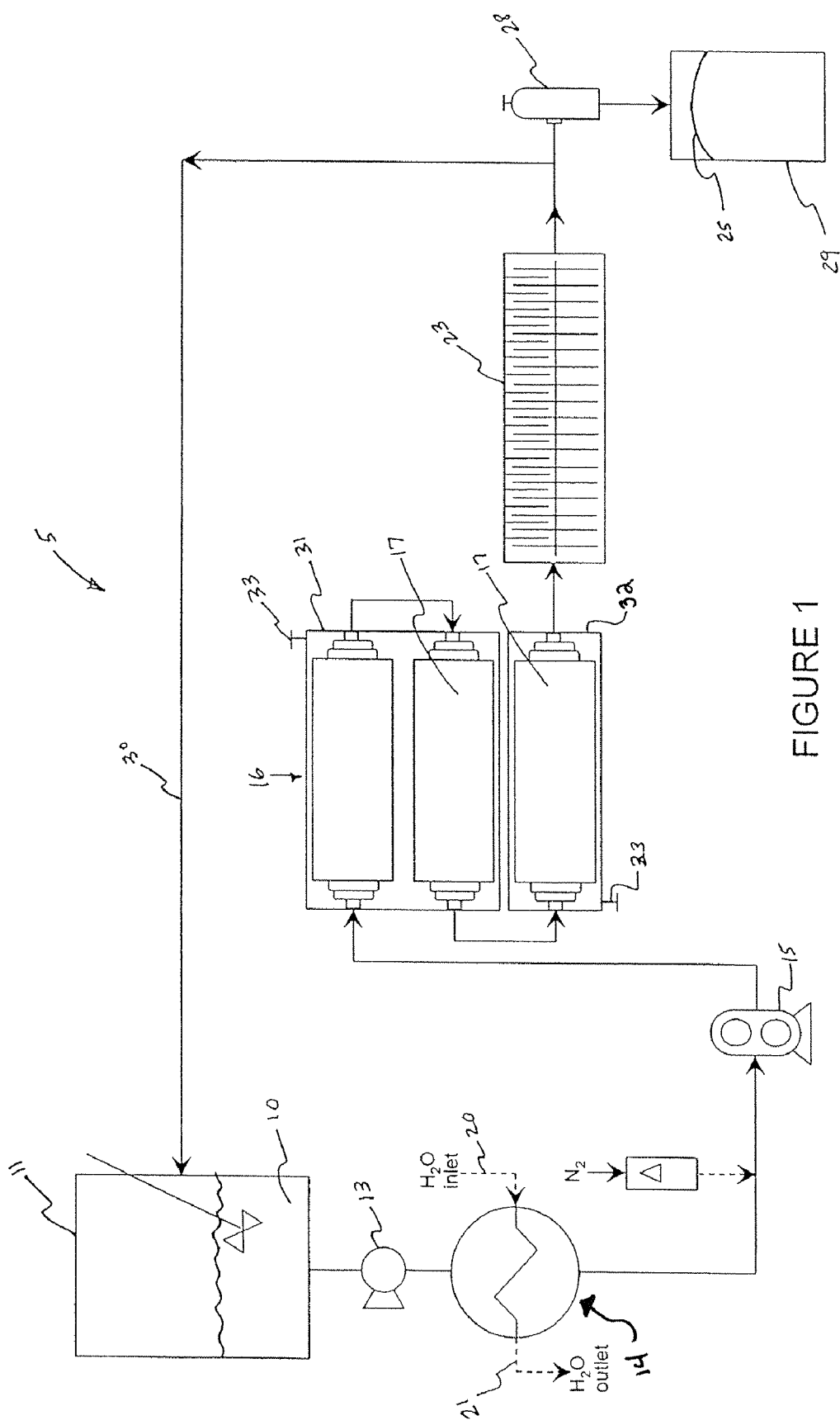
FIG. 1 is a line diagram of an embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

VIII. DETAILED DESCRIPTION OF THE INVENTION

The present invention relates generally to methods for preparing a shortening composition 25. Specifically, the present invention relates to methods for preparing a shortening composition 25 comprising an oil blend mixture 10 in which emulsifiers have been admixed with a non-hydrogenated vegetable oil. As used herein, the term "plastic" or "plasticity" is used to describe a shortening composition that is solid in appearance, yet assumes the rheological flow characteristics of a viscous liquid when subjected to a shearing force great enough to cause a permanent deformation. The term "iodine value" means the number of grams of iodine equivalent to halogen adsorbed by a 100 gram sample of fat, and measures the unsaturated linkages in the fat. Iodine value may be determined using the Wijs method, or AOCS Official Method Col. 1-25. The term "supercool" means the process of chilling a liquid below its melt or crystallization point, without the liquid transforming to a solid. The term "nucleation temperature" means the temperature at which crystal nuclei begin to form in a supercooled liquid when the liquid is supercooled at a cooling rate above the liquid's minimum cooling rate. The term "nucleation time" means the amount of time required to fully nucleate a supercooled liquid with crystal nuclei when the liquid is supercooled at a cooling rate above the liquid's minimum cooling rate. The term "minimum cooling rate" means the rate above which a supercooled liquid exhibits a constant nucleation temperature and constant nucleation time. The term "Mono- and diglyceride emulsifiers" is defined in 21 C.F.R. §184.1505.

The production of edible plastic fats is influenced by three basic processes: 1) formulation, including the choice of source oils and emulsifiers; 2) chilling, which initiates the crystallization process; and 3) tempering, which develops and stabilizes desirable crystal nuclei. With regard to formulation, although many types of non-hydrogenated vegetable oils may be employed in the practice of the inventions, one with ordinary skill in the art, without undue experimentation, should select a non-hydrogenated vegetable oil which does not impart unfavorable flavor characteristics and which is a liquid at room temperature. Preferably, the present invention may incorporate a non-hydrogenated vegetable oil with an iodine value between 100 and 135 to achieve commercially desirable solid characteristics upon preparation of the shortening composition 25. Most preferably, the present invention may incorporate non-hydrogenated soybean oil to produce a shortening composition with desirable characteristics.

In order to achieve the desired shortening composition 25, the non-hydrogenated vegetable oil should be blended with an emulsifier that promotes $\beta'$ crystal growth. Mono- and diglyceride emulsifiers may be commercially prepared from edible fats and oils of animal or vegetable origin. The process of preparing emulsifiers with an elevated concentration of diglycerides, typically by distillation, has been described in U.S. Pat. No. 5,908,655, and U.S. Publication No. 2007/0148312, each of which is incorporated herein by reference. Mono- and diglyceride emulsifiers, especially those with elevated concentrations of diglycerides, may be purchased commercially from Caravan Ingredients (Lenexa, Kans.). For example, one commercial product, Alphadim® 2 HS, ranges from about 65% to about 100% diglycerides (by weight), and has exhibited stable $\beta'$ crystallization. Preferably, $\beta'$-promoting emulsifiers should comprise up to about thirty percent (by weight) of the oil blend mixture 10 of the present invention. More preferably, $\beta'$-promoting emulsifiers should comprise between about ten percent and about thirty percent (by weight) of the oil blend mixture 10 of the present invention. Most preferably, $\beta'$-promoting emulsifiers should comprise about twenty percent (by weight) of the oil blend mixture 10 of the present invention.

Preferably, emulsifiers with elevated concentrations of diglycerides, may be used to prepare trans fat free all purpose shortening compositions 25. However, using the present invention and embodiments thereof, those of ordinary skill in the art should understand that mixtures may be blended from source oils, preferably non-hydrogenated vegetable oils that remain liquid at room temperature, and other mono- and diglyceride emulsifiers, provided that the nucleation time, nucleation temperature, and related cooling rate are pre-determined (as described below) and used to practice the present invention.

Typically, the fluid mixture 10 is supercooled to promote $\beta'$ crystal growth, then plasticized with mechanical work to prepare a shortening composition 25. To achieve the amount of heat transfer required in the supercooling phase, a scraped surface heat exchanger 16 is generally used in many shortening applications. The rotating blade action prevents clogging within the scraped surface heat exchanger 16, and a high degree of supercooling may be achieved as the fat is dynamically cooled in this manner. The mixture emerges from the heat exchanger cooled well below an equilibrium crystallization temperature, and thus is primed for $\beta'$ crystallization. The mixture then moves to the working unit 23 to provide an amount of mechanical work sufficient to impart desirable physical characteristics as the mixture 10 crystallizes. If mechanical work were not provided, the mixture 10 would form an extremely strong crystal lattice exhibiting a narrow plastic range. Instead, the mechanical work applied while crystals form provides highly desirable plastic characteristics to the shortening composition 25.

Although a fluid mixture 10 of non-hydrogenated vegetable oil and mono- and diglyceride emulsifiers exhibits different nucleation times and temperatures than partially hydrogenated soybean oil based shortenings or even palm oil based shortenings, the present invention may be utilized at existing manufacturing plants without additional machinery or personnel costs by adjusting the parameters of the product line to precisely control crystallization of the mixture 10 without overworking within the scraped surface heat exchanger 16 and working unit 23. Importantly, a minimum cooling rate, a nucleation temperature and a nucleation time may be determined for any blend of non-hydrogenated vegetable oil and emulsifiers by simply applying an increasing temperature rate to the blend and observing the formation of crystal nuclei and subsequent crystal growth, as is known in the art. In this manner, the minimum cooling rate, the nucleation temperature and the nucleation time may be utilized to prepare shortening compositions in accordance with the present invention. The cooling rate and temperature of the mixture 10 may be carefully controlled by controlling the line speed and the temperature of the heat transfer mechanism of the scraped surface heat exchanger 16. Thus the manufacturer may optimally specify when the formation of β' crystal nuclei begins as the mixture 10 moves through the scraped surface heat exchanger 16. Preferably, crystal nuclei are formed but crystal growth has not yet begun in earnest when the mixture 10 exits the heat exchanger 16 and enters the working unit 23. Accordingly, the cooling rate should be controlled such that the mixture 10 reaches its nucleation temperature when the mixture 10 is moving through the final cooling tube 17 of the heat exchanger 16.

Figure 3:
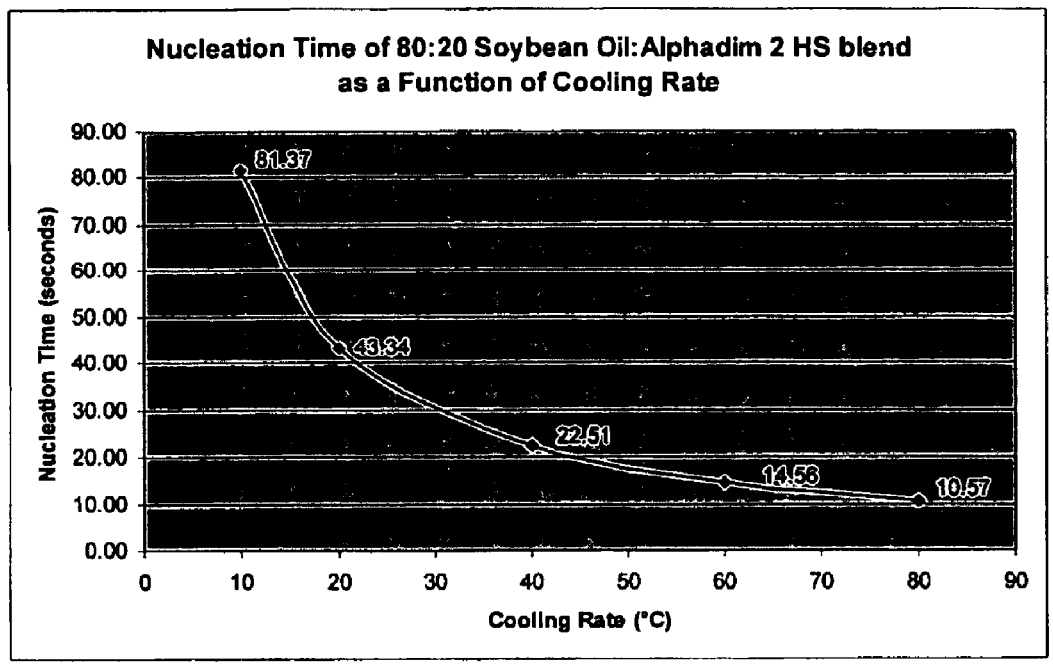
FIG. 3 is a graph showing the nucleation time of a vegetable oil-emulsifier blend as a function of the cooling rate.
Figure 4:
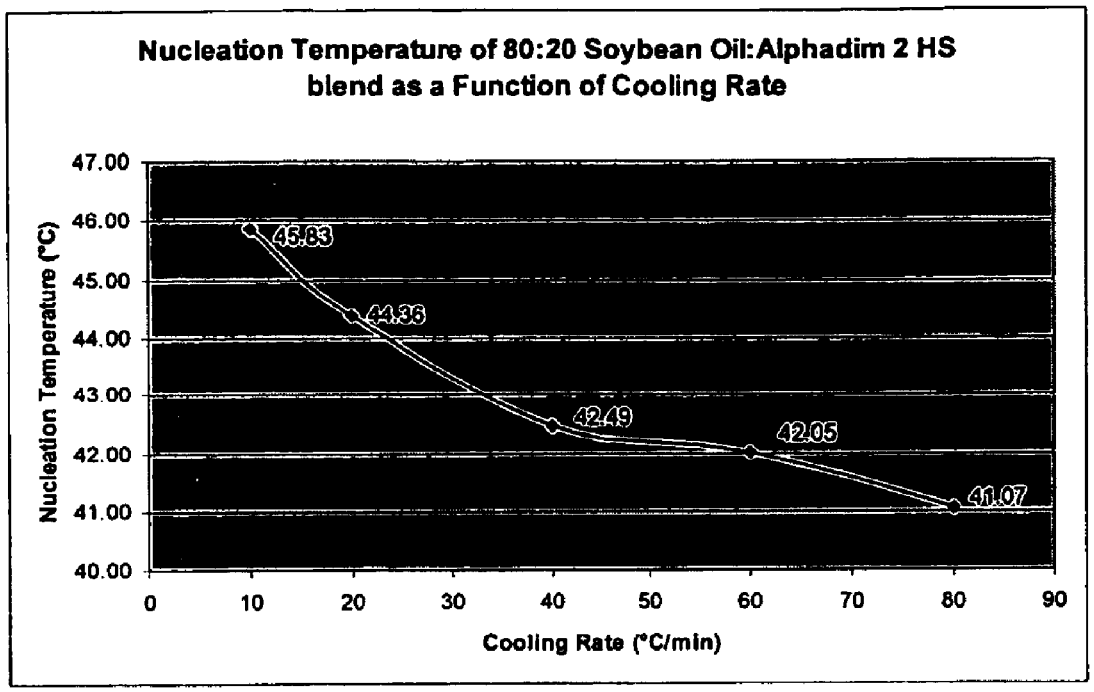
FIG. 4 is a graph showing the nucleation temperature of a vegetable oil-emulsifier blend as a function of the cooling rate.

In order to determine proper crystallization techniques using such a scraped surface heat exchanger 16, a mixture of eighty percent (by weight) non-hydrogenated soybean oil and twenty percent (by weight) Alphadim® 2 HS high diglyceride emulsifier (Caravan Ingredients, Lenexa, Kans.) was tested by the emulsifier's manufacturer to determine an average crystal nucleation time as a function of cooling rate and an average crystal nucleation temperature as a function of cooling rate. This data was used to determine the precise temperature at which crystal nuclei begin to form within the fluid mixture, e.g., the nucleation temperature, and how much time elapses before the fluid mixture is completely crystallized, e.g. the nucleation time. FIGS. 3 and 4 demonstrate that at a cooling rate of 176° F. per minute, a mixture 10 of non-hydrogenated soybean oil and Alphadim® 2 HS will begin to crystallize at approximately 105.8° F., and full crystallization will take approximately ten seconds. As the cooling rate increases beyond 176° F. per minute, the nucleation temperature and the nucleation time tend to form a plateau, indicating that the nucleation temperature and the nucleation time of this blend will not vary significantly at cooling rates greater than 176° F. per minute. As a result, the minimum cooling rate enables a manufacturer to optimally control the supercooling and working processes to prepare shortening compositions with desirable physical characteristics.

In most shortening compositions 25, an inert gas is dispersed into the composition to improve product appearance, overall consistency, and performance. Typically, vegetable shortenings contain from about ten percent to twenty percent nitrogen (by volume). In addition to nitrogen, other inert gases may be used, as is known in the art.

In a typical scraped surface heat exchanger 16, the apparatus features an internal shaft in the center of an insulated heat transfer tube. A narrow annular space through which the mixture 10 passes exists between the heat transfer tube wall and the internal shaft exists. The shaft is fitted with floating scrape blades, generally mounted in two rows. The heat transfer tube is fitted with a jacket for the heat transfer medium, generally ammonia ($NH_3$), water or steam. As the motorized shaft turns, the blades scrape the product from the heat exchange surface in a continuous manner, and heat is transferred between the heat transfer medium through the wall of the heat transfer tube to the mixture 10. The shaft may be heated internally by a water jacket or any other means to prevent shaft deposits from building up on the product side surface of the shaft. Scraped surface heat exchangers 16 are more fully described in U.S. Pat. Nos. 3,145,017, 4,073,339, and 4,185,352, each of which is hereby incorporated herein by reference.

In scraped surface heat exchangers used for supercooling the mixture 10 in the preparation of shortening composition 25, one or more refrigeration circuits 31 may control delivery of the heat transfer medium to the heat transfer tube 31 and/or the temperature of the heat transfer medium within the heat transfer tube 31. In such systems, the heat transfer medium is a refrigerant such as ammonia or water. Manipulation of the amount of refrigerant supplied to the refrigeration circuit 31, preferably with a valve 33, as well as the temperature of the refrigerant within the refrigeration circuit, allows the manufacturer to control the cooling rate of the mixture 10 as it moves through the scraped surface heat exchanger 16, and enables the manufacture to direct precisely, based upon line speed, known nucleation time and known nucleation temperature, when crystal nuclei form within the mixture 10.

Referring still to FIG. 1, the scraped surface heat exchanger 16 is typically in line with a working unit 23, known as a blender, picker box, pin rotor machine, etc. The working unit 23 mechanically works the mixture 10 to continue the crystallization process under controlled mechanical conditions, which improves the shortening composition's 25 blending capability and softness, and prevents the inert gas from bubbling within the composition. No cooling is applied within the working unit 23, but the mixture 10 heats due to the crystallization process (a kinetic process) and this heat is dissipated by the mechanical working. As the mixture 10 moves through the working unit, crystallization in a stable β' form produces a desirable, plastic shortening composition 25.

As described above, a liquid mixture of non-hydrogenated soybean oil and high diglyceride emulsifiers will begin to crystallize at a nucleation temperature of about 105.8° F., and will form crystal nuclei throughout the mixture over a nucleation time of about ten seconds therefrom, when the minimum cooling rate is about 176° F. per minute. Thus, for a manufacturing process utilizing a scraped surface heat exchanger 16 to supercool a mixture 10 comprising 80:20 non-hydrogenated soybean oil and high diglyceride emulsifiers, the cooling rate must be controlled to at least about 176° F. per minute throughout the scraped surface heat exchanger (i.e., through each cooling tube 17), and the temperature should reach at least about 105.8° F. before the mixture 10 exits the scraped surface heat exchanger 16. The mixture 10 then flows through the working unit 23 to receive mechanical working such that crystal growth continues in order to transform the mixture 10 into a plastic shortening composition.

For mixtures 10 comprising variations of source oils and emulsifers as described previously, the minimum cooling rate, the nucleation temperature and the nucleation time, as observed by one skilled in the art, will prescribe the flow rate through the continuous system 5 and the temperature and volume of the refrigerant within the refrigeration circuit 31 such that the mixture 10 consistently and repeatably emerges from the scraped surface heat exchanger with sufficient crystal nuclei such that the resulting crystal growth during mechanical work produces a stable β' structure.

In an embodiment of the present invention, a trans fat free all purpose shortening composition may be manufactured in the following manner. Between about 90 percent and about 70 percent (by weight) vegetable oil and between about 10 percent and about 30 percent (by weight) mono- and diglyceride emulsifiers are admixed to create a fluid mixture 10. Mixture 10 is then transformed within a continuous, closed loop manufacturing system 5 into a shortening composition 25, which is filled into containers 29 for commercial distribution. The shortening composition 25 should be creamy and opaque to white in appearance, bland and without flavor, with a firm texture, and generally capable of replacing traditional partially hydrogenated shortenings in commercial applications.

Referring to FIG. 1, the mixture 10 resides in a bulk tank 11. The components of the mixture 10, e.g. vegetable oil and emulsifiers, may be admixed before introduction to the bulk tank 11, or alternatively, the components of the mixture 10 may be admixed within the bulk tank 11 in accordance with methods known in the art. Preferably, the temperature of the bulk tank 11 is maintained at about 135° F. to 150° F.

Referring still to FIG. 1, a stuffing pump 13 drives the mixture 10 from the bulk tank 11 to a pre-cooler 14 through a piping system 30. Pre-cooler 14, as shown in FIG. 1, comprises a tube in shell heat exchanger, further comprising a water inlet line 20 and a water outlet line 21 to maintain a constant temperature within the pre-cooler 14, as is well known in the art. The mixture 10 should be cooled to a threshold temperature at which the fluid is relatively stable and exhibits no crystallization, e.g., preferably about 140° F. for non-hydrogenated soybean oil. In a pre-cooler 14 of the tube in shell variety, 140° F. may comprise the highest temperature available for the water circulating into the outer shell. In order to avoid premature crystallization within the mixture 10, the temperature of the mixture 10 preferably should not be cooled to a temperature less than the threshold pre-cooling temperature. The primary function of the pre-cooler 14 is to maintain constant feed temperature and could be used to reduce the heat load on the scraped surface heat exchanger 16, thus maximizing its cooling capacity and ensuring the greatest number of crystal nuclei are developed as the fat is supercooled.

Figure 2:
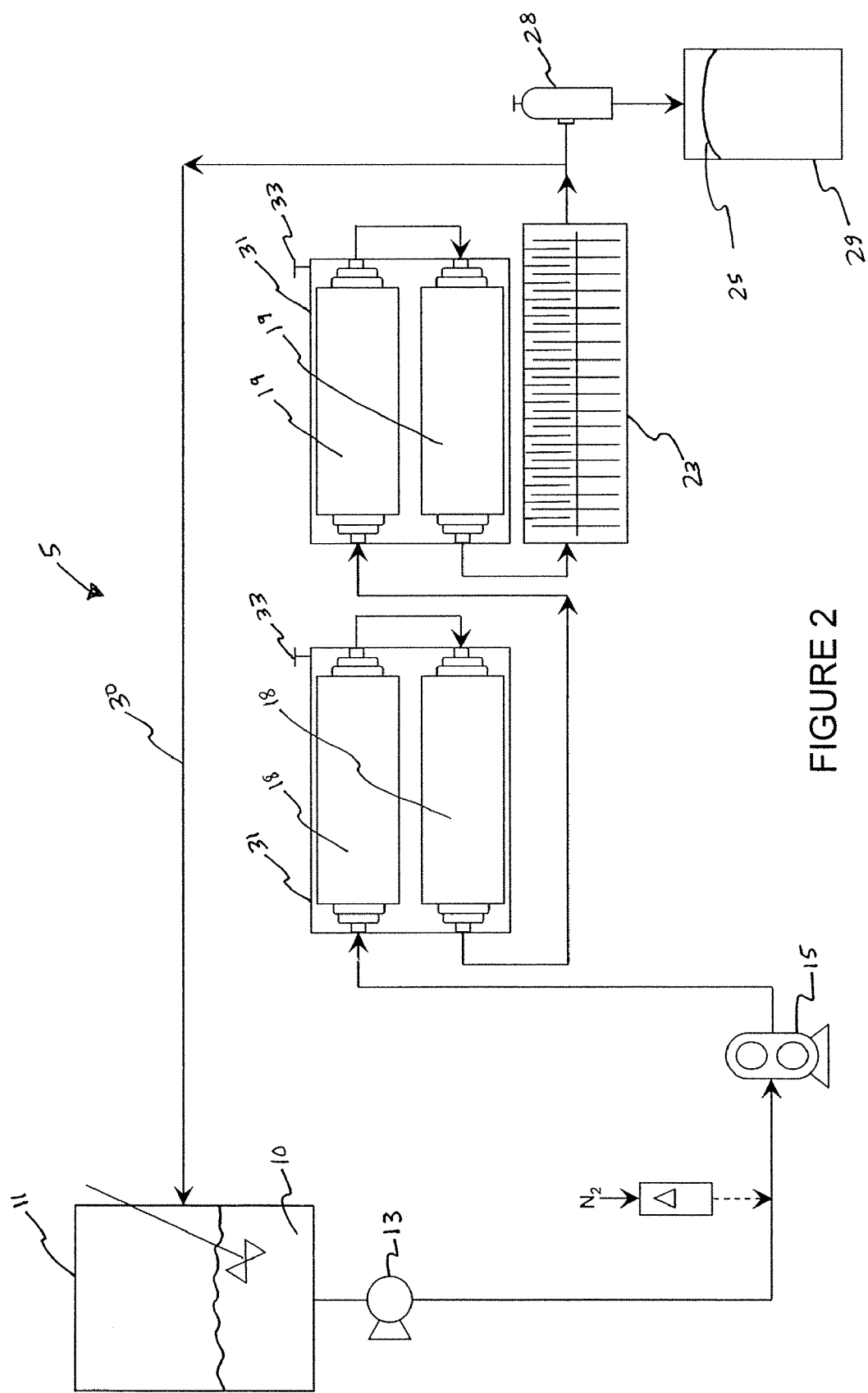
FIG. 2 is a line diagram of a second embodiment of the present invention.

In manufacturing plants where the bulk tank may provide more precise control of the mixture's 10 temperature, the pre-cooler 14 may not be needed to maintain constant feed temperature, and thus may be omitted, as shown in FIG. 2.

Referring again to FIG. 1, from the pre-cooler 14, the mixture 10 travels to a positive displacement pump 15. Before entering the positive displacement pump 15, about ten to about twenty percent (by volume) of an inert gas, preferably nitrogen, is injected into the mixture 10 within the continuous system 5. The positive displacement pump 15 pumps the mixture 10 from the pre-cooler 14 to a scraped surface heat exchanger 16, which comprises at least one cooling tube 17. Preferably, as shown in FIG. 1, the scraped surface heat exchanger 16 comprises multiple cooling tubes 17, each connected in series. In other embodiments, as shown in FIG. 2, the scraped surface heat exchanger 16 may further comprise two or more pairs of cooling tubes 18, 19. The speed of the positive displacement pump 15 creates a substantially constant flow rate and a substantially constant line pressure within the closed loop system 5. Back pressure within the line may be stabilized to insure a constant flow rate at the positive displacement pump. Preferably, the extrusion valve 28 filling the shortening composition 25 into containers 29 is used to maintain a constant flow rate within the system. Other features of the scraped surface heat exchanger 16 not particularly relevant to the present invention are well known to those skilled in the art and not described herein.

Referring again to FIG. 1, the mixture 10 travels through the scraped surface heat exchanger, where it cools rapidly due to the presence of at least one refrigeration circuit 31, which facilitates heat transfer within the scraped surface heat exchanger 16. In the embodiment shown in FIG. 1, a first refrigeration circuit 31 supplies refrigerant to the first cooling tube 17 and the second cooling tube 17, and a second refrigeration circuit 32 supplies refrigerant to the third cooling tube 17. The number of refrigeration circuits 31 may vary with the number of cooling tubes 17, or one refrigeration circuit 31 may supply refrigerant to all available cooling tubes 17. Each refrigeration circuit 31 comprises a sufficient amount of refrigerant, preferably ammonia, glycol, or a chlorofluorocarbon or hydrochlorofluorocarbon such as Freon® (E.I. Du Pont De Nemours & Co., Wilmington, Del.), whose circulation into that portion of the scraped surface heat exchanger 16 cooled by the refrigeration circuit may be manipulated by a valve 33. Manipulation of the valve 33 allows a manufacturer of the shortening composition 25 in accordance with the present invention to control the rate of cooling of the mixture 10 within scraped surface heat exchange 16, and thus control precisely where, within the heat exchanger, the mixture 10 reaches its pre-determined nucleation temperature such that crystal nuclei begin to form in the mixture 10. In the configuration shown in FIG. 1, an 80:20 non-hydrogenated soybean oil and high diglyceride mixture preferably reaches its nucleation temperature, 105.8° F., while traveling through the third and final cooling tube 17, and preferably cools to a temperature in the range of about 88° F. to about 90° F. by the time it exits scraped surface heat exchanger.

Referring to FIG. 1, the still fluid mixture 10, with newly formed crystal nuclei, moves through the continuous system 5 to a working unit 23. The nucleation time should not have elapsed by the time the mixture arrives within the working unit 23. The working unit 23, preferably a pin rotor machine, then mechanically works the crystallizing mixture 10, without additional cooling, which allows the mixture to transform into a plastic shortening composition 25. Although one working unit 23 is shown in FIG. 1, one or more working units 23 may be provided in series with cooling tubes 17 of the scraped surface heat exchanger 16, depending upon the volume available for working within each working unit 23.

As described above, the working unit 23 mechanically works the crystallizing mixture 10 until the prepared shortening composition 25 reaches a desired plasticity and appearance (as listed in Table 3). The working unit 23 should be operated at low speeds compared to working units used to prepare partially hydrogenated shortenings in order to avoid excessively working the shortening composition 25. Such overworking could result in soft or undesirable characteristics. Accordingly, one skilled in the art of manufacturing conventional shortenings will appreciate the amount of work required to produce consistent desirable shortening compositions 25. From the working unit 23, the product goes through an extrusion valve 28 before being filled into containers 29 with the shortening composition 25. Containers 29, which may vary in size, may be sold to bulk, wholesale or retail customers. Once the containers 29 are filled, optionally, they may be rested at an ambient temperature for two to three days to allow the shortening composition 25 to set properly within containers 29 before sale or delivery to customers.

The continuous system 5 may include an inline melter (not shown) to remelt any shortening composition 25 which does not get pumped into containers 29 and returns via the piping system 30 to the bulk tank 11 after being remelted by the inline melter. Persons of ordinary skill in the art will recognize when an inline melter would benefit any particular system 5.

Trans fat free all purpose shortening compositions 25 according to the method of the present invention were prepared at a manufacturing plant previously used to manufacture conventional pure vegetable shortenings containing partially hydrogenated soybean oil. The manufacturing plant consists of a closed loop system 5 featuring an ammonia-cooled Schröder Kombinator Type FK03 25-2000 (Gerstenberg Schröder A/S, Bröndby, Denmark) scraped surface heat exchanger 16. The Kombinator scraped surface heat exchanger 16 utilized in the product line featured three cooling tubes 17 (250 mm×2000 mm). Accordingly, each tube 17 had an interior heat transfer area of 1.57 m² and a volume of 16.5 liters, providing a total cooling tube volume of 49.5 liters. Each cooling tube 17 retained approximately 33.33 pounds of shortening composition 25, for a total cooling tube weight of approximately 100 pounds of shortening composition. The working unit 23 comprised a pin rotor machine (350 mm×2000 mm) with a total volume of 192 liters, and a total working weight of approximately 388 pounds. A first refrigeration circuit 31 cooled the first and second cooling tubes. A first ammonia inlet valve 33 controlled the level of ammonia within the first refrigeration circuit 31. A second refrigeration circuit 31 cooled the third cooling tube 17. A second ammonia inlet valve 33 controlled the level of ammonia within the second refrigeration circuit. The basic line diagram for the manufacturing plant is illustrated in FIG. 1.

Non-hydrogenated soybean oil (80 percent by weight) and Alphadim® 2 HS (Caravan Ingredients, Lenexa, Kans.) (20 percent by weight) were admixed into a fluid mixture 10. Alphadim® 2 HS comprises approximately 75% diglycerides after a distillation process, and was selected to provide the desired solid fat characteristics for commercial shortening applications (see Table 1) Other emulsifiers containing elevated levels of diglycerides may be used in the present invention. High diglyceride emulsifiers are known in the art to provide structure to edible fats without adding trans fats or saturated fats.

TABLE 1

| Shortening Characteristics | Commercial Embodiment |
| --- | --- |
| Shipping and storage temperature | 60° F.-85° F. |
| Iodine value | 100-114 |
| Peroxide value | 2.5 meq/Kg maximum |
| Melt point | 128° F.-132° F. |
| Solid Fat Content | 20.5 at 50° F. |
|  | 20.4 at 70° F. |
|  | 17.5 at 92° F. |
|  | 13.4 at 104° F. |
| Trans fat per serving | ~0 g |

Referring to FIG. 1, the liquid mixture 10 filled the bulk tank 11 at the beginning of the plant line. The temperature of the bulk tank 11 was maintained between 140° F. and about 150° F. A stuffing pump 13 propelled the mixture 10 from the bulk tank 11 forward to the pre-cooler 14 through the system 30. The pre-cooler 14 cooled the mixture 10 to a temperature of about 140° F. to about 150° F. to avoid cooling of the mixture 10 prior to the heat exchanger 16. Nitrogen gas ($N_2$) was injected at about 10 to 20% by volume into the continuous line system 5 as the mixture 10 moved from the pre-cooler 14 to a positive displacement gear pump 15, and admixed with the mixture 10 to form stable nitrogen bubbles within the mixture 10. Target is to get ~10% nitrogen entrained in the product.

After the nitrogen injection, the positive displacement gear pump 15 propelled the mixture 10 to the Kombinator's 16 three cooling tubes 17 and the working unit 23, in series. The positive displacement gear pump 15 was operated at varying speeds and pump settings, as shown in Table 4. Preferably, the shaft water temperature for the Kombinator 16 was maintained at about 140° F. to minimize a build up of fats upon its rotating shaft. The ammonia entering the first refrigeration circuit 31 through $NH_3$ I 33 was maintained at about 0 to about 20° F. The ammonia entering the second refrigeration circuit 31 through $NH_3$ II 33 was maintained at about −5 to 0° F. In this manner, cooling of the mixture 10 was precisely controlled such that crystal nuclei began to form within the mixture 10 within, and preferably near the end of, the final cooling tube 17, or after the mixture 10 had been exposed to approximately 4.71 m² of heat transfer area while introduced to mechanical turbulence in the form of rotating scraped surface blades.

As shown in Table 5, variables within the closed loop system 5 produced shortening compositions 25 with small variations in consistency. Preferably, the parameters indicated in the third column produced the most consistent and desirable shortening composition within this plant line. Essentially, cooling within the three cooling tubes 17 was precisely controlled to prevent crystallization of the mixture 10 until the mixture 10 was within the third cooling tube 17. In this manner, the mixture 10 avoided too mechanical much work being applied to the shortening composition 25 after crystallization. The working unit 23 speed was kept low enough to allow the transforming shortening composition 25 to move adequately through the working 23 without exposing the shortening composition 25 to an excessive amount of much mechanical work, preferably from about 40 to about 80 revolutions per minute. Finally, the positive displacement gear pump 15 created a back pressure within the continuous system 5, which was adjusted by an extrusion valve 28, within the range of about 200 psi and about 300 psi, which created a consistent fill appearance and an adequately firm texture. From the extrusion valve 28, the shortening composition 25 was packaged into containers 29 for sale to customers, as is well known in the art. An additional tempering step, also well known in the art, may be utilized to stabilize the plastic structure of the shortening composition before shipment to a final destination for sale.

As may be apparent to those skilled in the art, preferred set points for a desirable and commercially viable shortening composition 25, as driven by cooling rate, nucleation temperature and nucleation time, included: the positive displacement pump 15 speed and/or the line speed, the ammonia temperature for both refrigeration circuits, the back pressure within the line, the working unit speed, the bulk tank 11 temperature, and the shaft water temperature within the scraped surface heat exchanger. Additionally, suggested set points included the percentage of inert gas injection and the fill temperature.

TABLE 2

| Flow Rate (lbs/hr) | Time in 1 tube (sec) | Time in 3 tubes (sec) | Time in Working Unit (sec) |
| --- | --- | --- | --- |
| 25,000 | 4.80 | 14.41 | 55.91 |
| 24,000 | 5.00 | 15.00 | 58.17 |
| 23,000 | 5.22 | 15.65 | 60.72 |
| 22,000 | 5.45 | 16.36 | 63.50 |

TABLE 3

| Line Variable | Multiple Runs | Preferred Embodiment |
|---|---|---|
| Run Tank Temp. (° F.) | 138-164 | 140-150 |
| Pre-Cooler Water Temp (° F.) | 137.6-142.1 | 140 using to avoid pre-cooling and crystallizing the product |
| Tube 2 Exit Temp. (° F.) | 97.3-104.5 | 104 |
| Tube 3 Exit Temp. (° F.) | 88.0-96.4 | 88 |
| Fill Temp. (° F.) | 84.8-98.9 | 88-90 |
| Shaft Water Temp. (° F.) | 137.6-141.6 | 140 |
| Working Unit speed (rpm) | 50 | 50 |
| Pressure at Pump (psi) | 244-338 | 250-300 |
| $NH_3$ I Temp. (° F.) | −1 to 21 | 20 |
| $NH_3$ II Temp. (° F.) | −5 to 0 | −5 |
| $N_2$ Setting (units) | 14-20 | 15-20 |
| Fill speed (sec/100 lbs) | 14.8-16.9 | 15.0-15.2 |
| Line Speed (lbs/hr) | 21480-24000 | 23000-24000 |

It should be understood that some traditional manufacturing plants may comprise closed loop systems featuring varying numbers of cooling tubes or working units, varying numbers of refrigeration circuits, and the like. A pre-cooler may or may not be present. To this end, one skilled in the art will recognize that the present invention embodies a method of preparation of a trans fat free purpose shortening which utilizes a minimum cooling rate, a nucleation temperature and a nucleation time for individual mixtures of non-hydrogenated vegetable oils and emulsifiers, preferably those with elevated concentrations of diglycerides, to precisely control the crystallization of the fluid mixture such that the mixture transforms into a shortening composition with a solid profile as described in Table 1.

Many modifications and other embodiments of the inventions set forth herein will come to mind to one skilled in the art to which these inventions pertain having the benefit of the teaching presented in the foregoing descriptions and the associated drawings. It is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for preparing a shortening composition comprising the steps of:
   a) blending a non-hydrogenated vegetable oil with an emulsifier to form a liquid mixture consisting essentially of the non-hydrogenated vegetable oil and the emulsifier, the emulsifier comprising monoglycerides and diglycerides;
   b) utilizing a pre-determined minimum cooling rate, a nucleation temperature and a nucleation time for the mixture;
   c) blending an inert gas into the liquid mixture until the mixture comprises at least about 5 percent by volume inert gas;
   d) pumping the mixture through a scraped surface heat exchanger to rapidly cool the mixture;
   e) controlling the cooling rate of the mixture within the scraped surface heat exchanger such that the temperature of the mixture changes at a rate of at least the minimum cooling rate;
   f) pumping the cooled mixture from the scraped surface heat exchanger to a working unit once the mixture is cooled to the nucleation temperature but before the nucleation time has elapsed, wherein the nucleation time is measured from the moment at which the mixture reaches the nucleation temperature, wherein the mixture has an outlet temperature ranging from about 88° F. to about 105° F., and wherein the working unit mechanically works the cooled mixture to form a shortening composition; and
   g) transferring a metered amount of the shortening composition from the working unit into a container.

2. The method of claim 1, wherein the emulsifier comprises more diglycerides than monoglycerides.

3. The method of claim 2, wherein the emulsifier comprises about 65% to about 100% by weight diglycerides.

4. The method of claim 3, wherein the vegetable oil is liquid at room temperature.

5. The method of claim 4, wherein the vegetable oil comprises soybean oil.

6. The method of claim 5, wherein the emulsifier comprises at least sixty-five percent by weight diglycerides.

7. The method of claim 6, wherein the mixture comprises about eighty percent by weight soybean oil and about twenty percent by weight emulsifiers, such that the nucleation temperature comprises about 105.8° F., the nucleation time comprises about ten seconds, and the minimum cooling rate comprises about 176° F. per minute.

8. The method of claim 1, wherein the inert gas is selected from the group consisting of nitrogen, helium, argon, and carbon dioxide.

9. The method of claim 1, wherein the mixture exits the scraped surface heat exchanger at a temperature ranging from about 88° F. to about 90° F.

10. The method of claim 1, wherein the scraped surface heat exchanger comprises at least one cooling tube.

11. The method of claim 1, wherein the scraped surface heat exchanger comprises a plurality of cooling tubes connected in series.

12. The method of claim 11, wherein crystal nuclei first begin to form within the mixture as the mixture flows through the final cooling tube connected in series.

13. The method of claim 12, wherein the mixtures transforms from a liquid state to the shortening composition during mechanical working within the working unit.

14. The method of claim 10, wherein the scraped surface heat exchanger comprises one or more refrigeration circuits, each refrigeration circuit comprising an amount of refrigerant sufficient to cool at least a portion of the scraped surface heat exchanger.

15. The method of claim 14, wherein the amount of refrigerant within each refrigeration circuit is adjusted to control the cooling rate of the mixture within the scraped surface heat exchanger.

16. The method of claim 15, wherein the amount of refrigerant within each refrigeration circuit is adjusted by a valve.

17. The method of claim 16, wherein the temperature of the refrigerant in each refrigeration circuit is adjusted to control the cooling rate of the mixture within the scraped surface heat exchanger.

18. The method of claim 17, wherein the temperature of the refrigerant in at least one refrigeration circuit is within the range of about −5 to about 20° F.

19. The method of claim 14, wherein the refrigerant within each refrigeration circuit is selected from the group consisting of glycol, a chlorofluorocarbon, a hydrochlorofluorocarbon, and ammonia.

20. The method of claim 1, further comprising the step of pre-cooling the liquid mixture to a threshold temperature such the mixture remains fluid and no crystallization occurs before pumping the mixture through a scraped surface heat exchanger to rapidly cool the mixture.

21. The method of claim 20, wherein the threshold temperature is between about 140 to about 150° F.

22. The method of claim 11, wherein the mixture reaches its nucleation temperature when the mixture is moving through the final cooling tube connected in series.

23. A method for preparing a shortening composition comprising the steps of:
  a) blending a non-hydrogenated vegetable oil with an emulsifier to form a shortening mixture, the emulsifier comprising monoglycerides and diglycerides;
  b) utilizing a pre-determined minimum cooling rate, a nucleation temperature and a nucleation time for the mixture;
  c) blending an inert gas into the mixture until the mixture comprises at least about 5 percent by volume inert gas;
  d) pumping the mixture through a scraped surface heat exchanger to rapidly cool the mixture;
  e) controlling the cooling rate of the mixture within the scraped surface heat exchanger such that the temperature of the mixture changes at a rate of at least the minimum cooling rate;
  f) pumping the cooled mixture from the scraped surface heat exchanger to a working unit once the mixture is cooled to the nucleation temperature but before the nucleation time has elapsed such that the mixture has an outlet temperature ranging from about 88° F. to about 105° F.;
  g) applying mechanical work to the mixture in the working unit to form a shortening composition; and
  h) transferring a metered amount of the shortening composition from the working unit into a container.

* * * * *